United States Patent [19]

Shtipelman

[11] Patent Number: 4,860,137
[45] Date of Patent: Aug. 22, 1989

[54] FLEXURE-MOUNTED RADIAL ACCESS APPARATUS FOR DISK RECORDER/PLAYER

[75] Inventor: Boris A. Shtipelman, Rochester, N.Y.

[73] Assignee: Eastman Kodak Company, Rochester, N.Y.

[21] Appl. No.: 164,698

[22] Filed: Mar. 7, 1988

[51] Int. Cl.$^4$ .......................... G11B 5/55; G11B 21/08
[52] U.S. Cl. ....................................... 360/106; 360/104
[58] Field of Search ............... 360/106, 104, 105, 109, 360/75, 76

[56] References Cited

U.S. PATENT DOCUMENTS 4,426,669 1/1984 Bryer .................................... 360/106
4,556,924 12/1985 Quist, Jr. et al. .................... 360/106
4,775,907 10/1988 Shtipelman .......................... 360/106

Primary Examiner—Stuart N. Hecker
Assistant Examiner—David J. Severin
Attorney, Agent, or Firm—Warren W. Kurz

[57] ABSTRACT

Radial access apparatus for controlling the coarse and fine radial position of a read/write head relative to a data storage disk (e.g. optical, magneto-optical and magnetic disks) comprises a radial access arm supported for movement about a virtual pivot point by a pair of converging flexure members. An electromagnetic motor is provided for controlling the position of the arm to position a read/write head, supported by such arm, opposite a desired data track on the disk.

5 Claims, 4 Drawing Sheets

FLEXURE-MOUNTED RADIAL ACCESS APPARATUS FOR DISK RECORDER/PLAYER

BACKGROUND OF THE INVENTION

This invention relates to the field of data recording and playback and, more particularly, to improvements in apparatus for controlling the radial position of a write/read head relative to a data storage disk so that information can be written on (or read from) a desired data track.

Heretofore, a variety of radial access mechanisms have been proposed and utilized for controlling the radial position of a write/read head relative to the recording surface(s) of data storage disks (e.g. magnetic, magneto-optic, and optical disks). Typically, such mechanisms function to advance the head along straight or circular trajectories in a plane parallel to the plane of disk rotation. For straight head motion, both stepping and linear motors of various designs have been used. With a stepping device, the rotary motion of the motor shaft is commonly converted to linear motion by a lead screw, rack and pinion combination, or quite often, by a split band wrapped around the motor shaft. Stepping motors are also used in circular trajectory schemes. For a linear motor, its motion is directly coupled to a movably-mounted carriage which supports the head. In most cases, regardless of the driving scheme, the head carriage is suspended by a number of bearings or bushings that require precise alignment and high precision in parts manufacture to avoid the problems associated with backlash and friction.

In U.S. Pat. No. 4,426,669, issued to P. Bryer, there is disclosed a bearingless, backlash-free radial access mechanism which incorporates two pairs of flat or planar flexure members. One pair of flexure members serves to support a movable carriage on which a write/read transducer is mounted. The other pair serves to support the first pair, thereby enabling the carriage to move along a linear path. The carriage also supports a voice coil or the like which is disposed in a permanent magnetic field and surrounds a magnetizable stator. By applying current to the coil, the coil (and its supporting carriage) is advanced in one direction or the other in the magnetic field, such movement being limited to a linear path by the flexure members.

While the radial access mechanism disclosed to the aforementioned patent affords several advantages over those mechanisms employing bearings and bushings, it is a relatively large in physical size and, hence, does not lend itself for use in small disk drives.

SUMMARY OF THE INVENTION

In view of the foregoing, an object of this invention is to provide a bearingless, backlash-free radial access mechanism which is both simpler in construction and more compact in size than similar mechanisms proposed heretofore.

The radial access mechanism of the invention basically comprises a single pair of flat flexure members, means for supporting such flexure members along one of their respective edges, so that the remaining unsupported portions of such members converge towards a line of convergence, a radial access arm interconnecting the respective unsupported ends of the flexure members at a location short of such line of convergence, and electromagnetic means for controlling the movement of the access arm about a virtual point located in the neighborhood of the point where the flexure members converge. The access arm supports a read/write head, preferably at a nominal location intermediate the flexure supports. The radial access apparatus is so located relative to a data storage disk that the head orientation is substantially the same relative to each data track on the disk as the head moves along an arcuate path from the innermost to the outermost data track.

The invention and its various advantages will become more evident to the skilled artisan from the ensuing description of preferred embodiments.

DETAILED DESCRIPTION OF PREFERRED EMBODIMENTS

Figure 1:
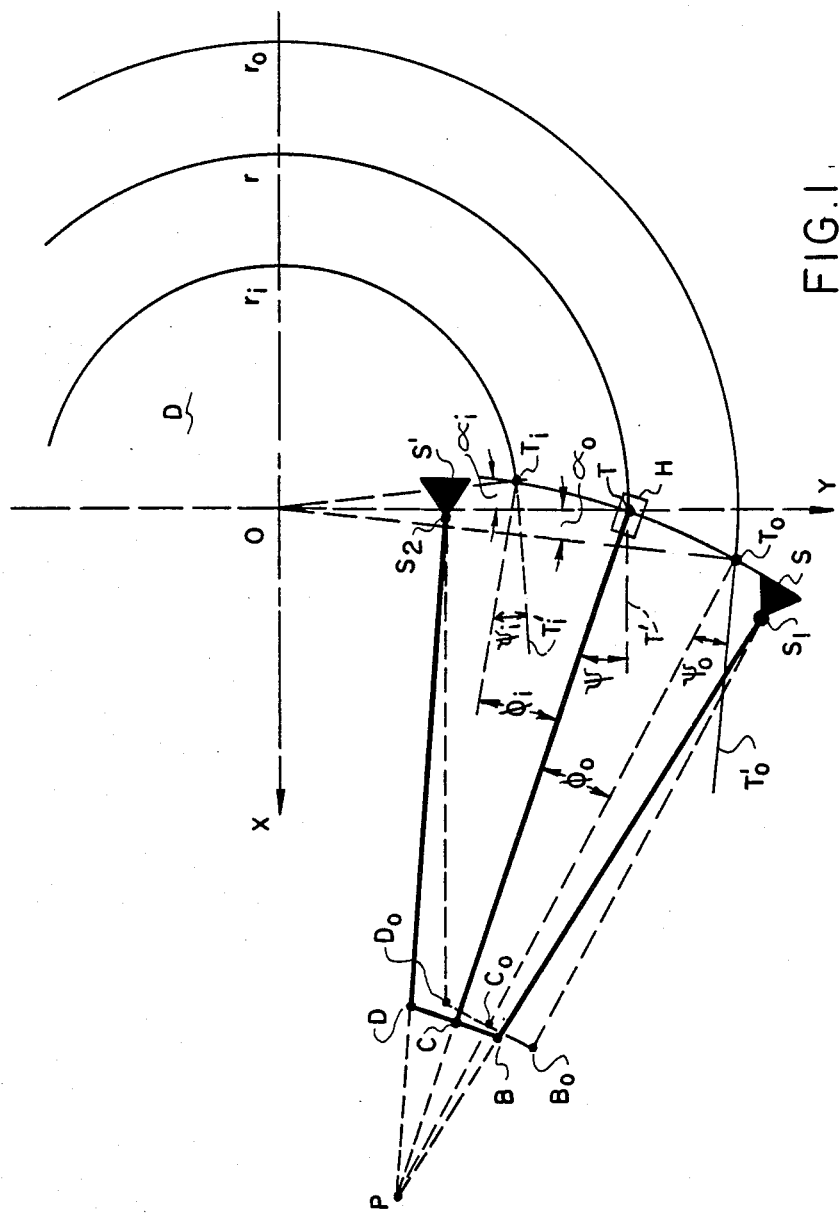
FIG. 1 is a schematic illustration of a flexure mechanism forming the basis of the radial access apparatus of the invention.

Referring to FIG. 1, the radial access apparatus of the invention can be viewed as comprising two converging flexure members $BS_1$, and $DS_2$, a linking member BD, and a pair of stationary supports S, S'. The latter serve to support members $BS_1$ and $DS_2$ at their respective ends $S_1$, and $S_2$. When the flexure members are located in the nominal position (shown in solid lines), their respective unsupported ends converge toward a point P. As shown, linking member BD connects the converging flexure members before reaching this convergence point.

Rigidly connected to and extending perpendicularly outward from linking member BD, in the region between supports S and S', is a radial access arm CT which supports a read/write head H. As will be appreciated, arm CT undergoes a seemingly pivotal movement about point P as elements $BS_1$ and $DS_2$ flex about their respective supports. (Note, the movement of arm CT is not truly pivotal about point P owing to the flexibility of the flexure members. But the deviation from the true pivotal movement can be minimized, for example, by designing the flexure members in the manner described below.) Head H may comprise any data recording or playback head (e.g. an optical, magnetic or magneto-optical head) which serves to record and/or playback information on data tracks located on the disk between an inner radius $r_i$ and outer radius $r_o$.

As shown in solid lines in FIG. 1, the nominal position of the mechanism corresponds to the case where the head is located at point T on the disk's mean track radius r. Here, the head orientation relative to the data track is characterized by the angle $\Psi$. Because of the often non-symmetrical nature of the head itself, or, alternatively, the recording spot produced thereby, it is desirable that the head/track orientation angle $\Psi$ be the same for all tracks, regardless of the radial position of the head relative to the disk. While the radial access apparatus cannot achieve this ideal, the head/track orientation angle can be kept within acceptable limits if the apparatus is positioned in a particular manner with respect to the disk, as described below.

Still referring to FIG. 1, it will be appreciated that head H will move along an arcuate trajectory $T_o T T_2$ as elements $BS_1$ and $DS_2$ flex relative to their respective supports S and S'. As illustrated, when elements $BS_1$ and $DS_2$ flex counterclockwise into the positions $B_oS_1$ and $D_oS_2$, respectively, link BD will be moved to a position $B_oD_o$. As a result of such movement, arm CT will move to position $C_oT_o$, causing the head it supports to move to the outside disk track at radius $r_o$. The angular change in arm CT produced by counterclockwise movement of elements $BS_1$ and $DS_2$ is characterized by an angle $\Phi_o$, which results in a changed head orientation defined by angle $\Psi_o$. In this case, point $T_o$ where the head meets the outside track is angularly dislocated by an angle $\alpha_o$ relative to the radial line OT on which the head meets the mean track r. It will be appreciated from similar analysis that, when elements $BS_1$ and $DS_2$ are flexed clockwise relative to their respective supports S and S', arm CT will pivot through an angle $\Phi_i$, causing head H to move to the innermost track at radius $r_i$. Here, the head/track orientation will be at a changed angle $\Psi_i$, and the head will be angularly dislocated relative to radial line OT by an angle $\alpha_i$. It can be shown that wherever the condition $\Phi-\alpha=O$ is met, the head/track orientation angle will be the same; that is, whenever the angular displacement ($\Phi$) of the access arm is compensated by an equal angular displacement ($\alpha$) between a radial line connecting the disk center and the head position prior to head movement, and a radial line connecting the disk center and the head after head movement, the head/track orientation will be the same at the initial and new head positions. A geometrical proof is provided with reference to FIG. 2.

Figure 2:
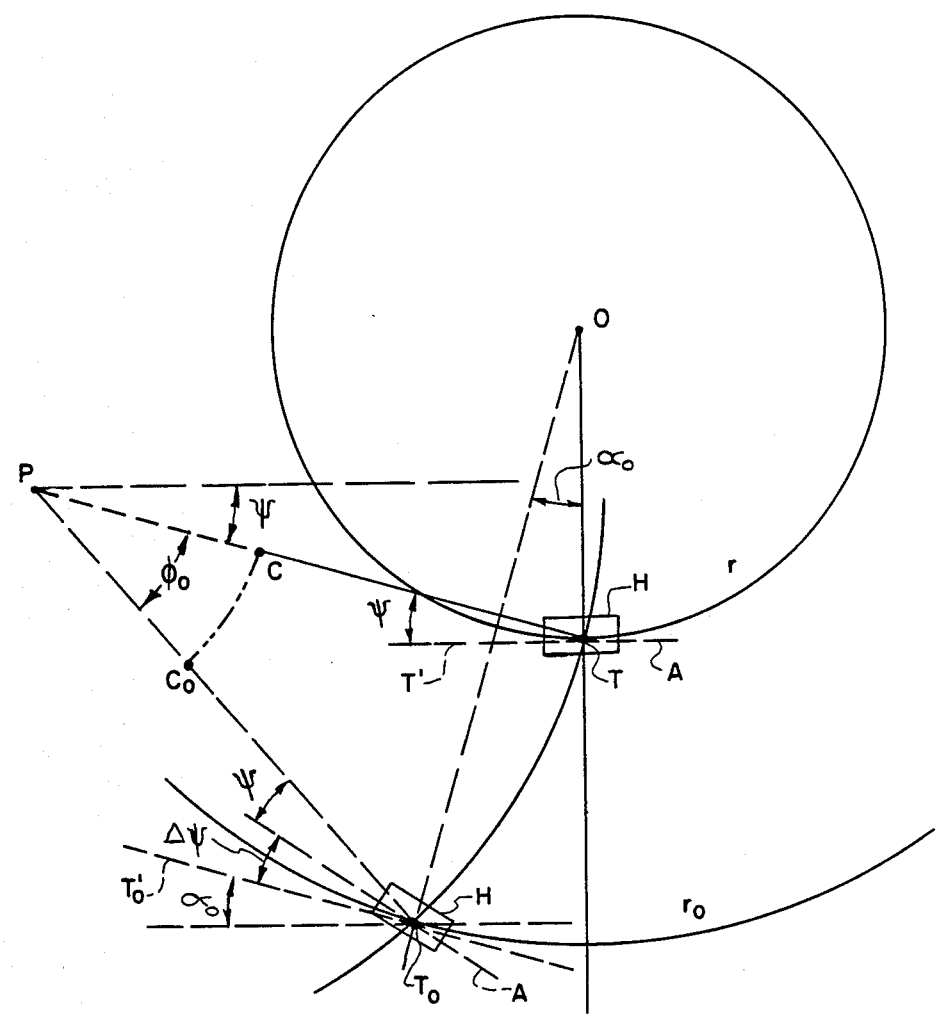
FIG. 2 is a fragmental view of FIG. 1 where the angular parameters of the mechanism are defined.

Referring to FIG. 2, when arm CT rotates through angle $\Phi_o$ to a new position $C_oT_o$, head H moves from an initial position at disk radius r to a position at disk's outer radius $r_o$. At the mean radius r, the head/track orientation angle $\Psi$ may be defined as the angle between arm CT and the tangent T' to the mean track at the point T. Angle $\Psi$ also is equal to the angle between arm CT and the longitudinal axis A of the head, such axis coinciding with tangent T' at point T. After movement of the arm to its new position $C_oT_o$, it may be seen that the tangent $T_o'$ to the new track at point $T_o$ no longer coincides with axis A, and the angle between arm $C_oT_o$ and tangent $T_o'$ is equal to $\Psi+\Delta\Psi$. From simple geometry, it is apparent that the angle between the tangents T' and $T_o'$ (i.e. $\alpha_o$) is equal to the angular dislocation $\alpha_o$ of point T in moving to its new position at $T_o$. Since $\Psi+\Phi_o=\Psi+\Delta\Psi+\alpha_o$, the relationship $\Delta;105 =\Phi_o-\alpha_o$ becomes obvious. Thus, whenever $\Phi_o=\alpha_o$, the orientation error angle $\Delta\Psi$ is zero. Therefore, in positioning the radial access apparatus relative to the disk center O, this condition should be achieved, as closely as possible, to minimize head/track orientation error.

Figure 3:
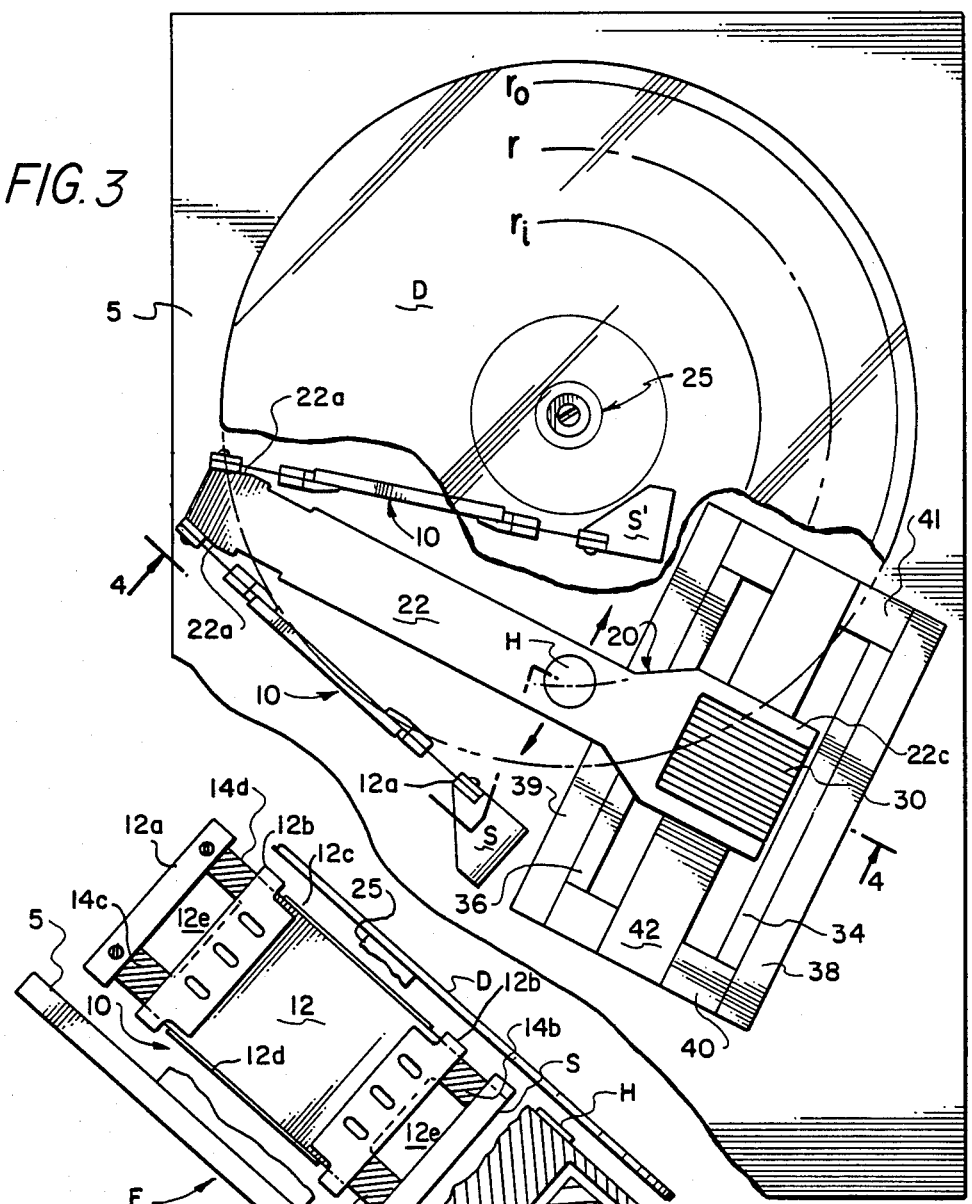
FIG. 3 is a top plan view of a preferred embodiment of the invention.
Figure 4:
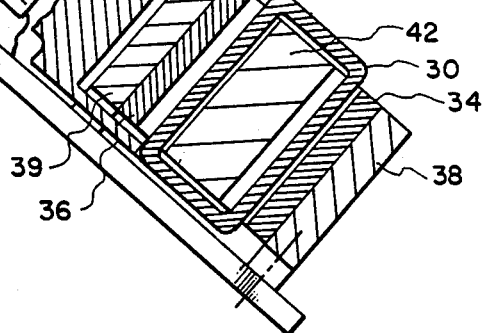
FIG. 4 is a partial sectional view of the FIG. 3 apparatus taken along the section line 4—4.
Figure 5:
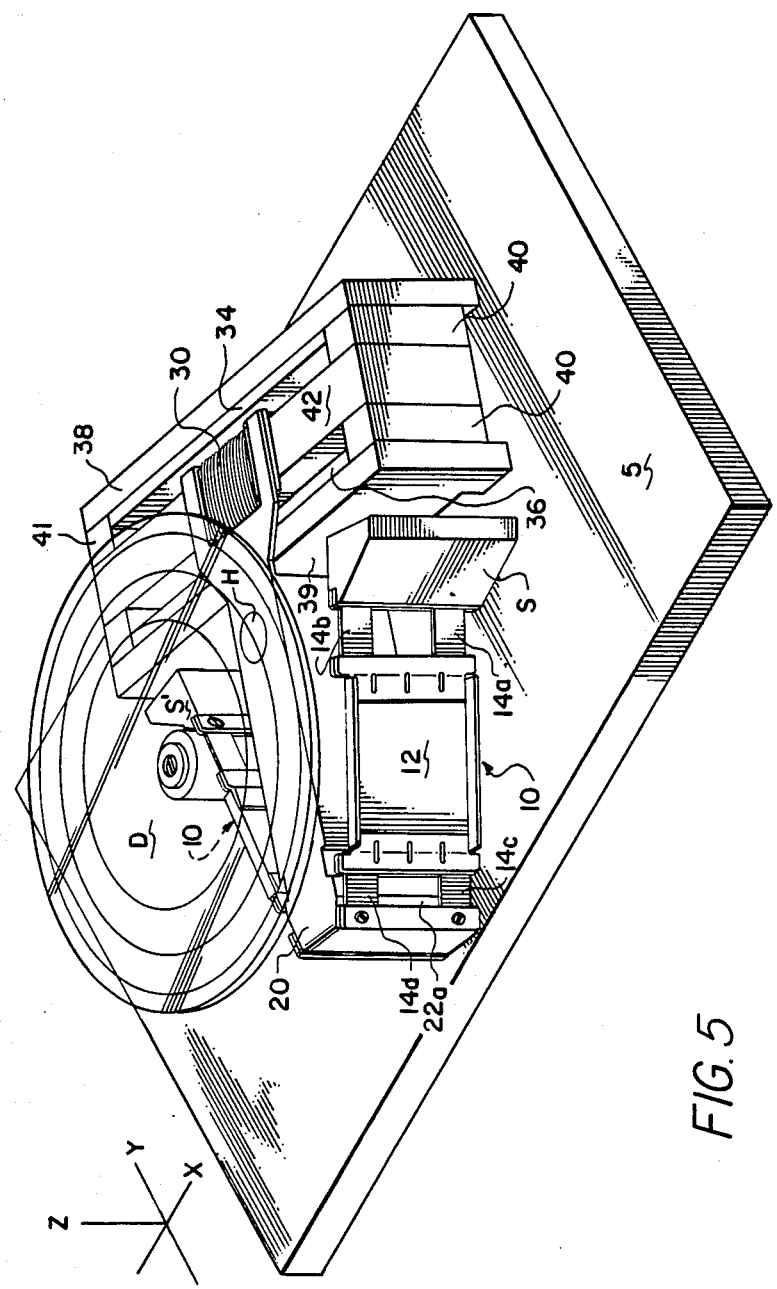
FIG. 5 is a perspective view of the FIG. 3 apparatus.

Referring now to FIGS. 3-5, the flexure mechanism discussed above is embodied in a radial access apparatus comprising a frame F on which a pair of upright supports S, S' are mounted. Each of them supports one edge of a planar flexure 10 so that the flexure member extends perpendicular to and spaced from the upper surface 5 of the frame, and the supports are arranged so that the respective unsupported portions of the flexure members converge toward a line of convergence located outside the actual border of frame F. Each flexure member preferably comprises a thin (e.g. 0.10 mm) rectangular metal plate 12, e.g. of a berilluim-copper alloy, reinforced by molded plastic portions 12a and 12b. The top and bottom edges 12c, 12d, of plate 12 are bent at 90° to increase the plate's rigidity in the horizontal (i.e. $R \times r$) plane. Two rectangular cut-outs 12e in plate 12 create four connecting tabs 14a–14d, of the same material and thickness as plate 12. Flexure ends with tabs 14a and 14b are rigidly connected to supports S, S', and opposing flexure ends with tabs 14c and 14d are connected to a radial access arm 20, as explained below. Tabs 14a–14d behave like hinges during the radial access movement of arm 20, allowing the arm to undergo a seemingly pivotal movement.

As indicated above, flexure members 10 serve to support a radial access arm 20 which contains all of the essential elements of a conventional magnetic, magneto-optic or optical read/write head. Schematically, such head is depicted as circle H, indicating, for example, the objective lens of an optical write/read head. As shown, arm 20 has an elongated portion 22 which, in addition to supporting the read/write head together with all required elements of a magnetic or optical system (laser, optics, detectors, etc.), also supports a coil 30 of a linear voice coil motor for controlling the radial position of head H relative to a rotating data storage disk D. The latter is supported for rotation on a spindle 25, and the radial access apparatus is positioned between the supporting frame F and the rotating disk.

Radial access arm 20 comprises a rectangularly sectioned elongated housing 22. Its end 22a is shaped as a wedge to which tabs 14c and 14d of the flexure members are clamped. By this configuration, arm 20 will assume a nominal position intermediate flexure supports S, S'. Preferably, the portion of the read/write head that directly interacts with the data storage disk during the actual reading or writing of information (i.e. circle H in the drawings), is located to move between the flexure supports.

To create a seemingly pivotal motion of arm 20 and, hence to control the radial position of head H relative to disk D, arm 20 supports a rectangularly shaped voice coil 30 which, when current is selectively applied to it, moves within a magnetic field. As shown, coil 30 is supported by the forked-shaped end 22c of arm 22. The magnetic field is provided by a pair f permanent magnets 34, 36, which are arranged within a flux-confining magnetizable frame (e.g. made of steel) comprising a middle core plate 42, end pieces 40, 41, and plates 38, 39 supported by frame F. If desired, the frame elements and magnets may be shaped to correspond to the arcuate trajectory followed by coil 30 as arm 20 moves. Such a configuration would provide a smaller air gap between the magnet and middle core surfaces where the coil is located. This results in a higher magnetic flux density in the gap and a larger force developed by the motor. Another modification of the motor may be provided by orienting it in such a way so that both magnets and magnetizable frame plates are parallel to the surface of the disk resulting in a much better protection of the disk from the stray flux. Additionally, since coil 30 and the exerted by the motor driving force will be closer to the head, dynamic conditions for the actuator performance will improve as well.

In use, current from an external source is applied to coil 30, preferably through electrical leads contained by the head housing 22. Depending on the current level and its polarity, arm 20 will swing about its virtual pivot axis, thereby causing the read/write head H to cross the tracks along an arcuate path, as discussed above, to position the head opposite desired data tracks between radii $r_i$ and $r_o$. As noted above, if the mechanism is properly located relative to the disk center, the head/track orientation error ($\Delta\Psi$) can be minimized, the amount of such error depending, of course, on the effective length of the pivot arm. But even for an arm having an effective length of 5 cm., the head/track orientation error can be held to within ±0.75° for radial head dislocation of about 17 mm., the approximate distance between inside and outside tracks of a data storage disk of about 9 cm. diameter.

Compared to the aforementioned prior art mechanism in which the head-supporting carriage moves linearly along the disk radius, the radial access apparatus of the invention is particularly advantageous from the following standpoints:

(a) by virtue of its pivotal movement, the mechanism is more compact and, hence, can be incorporated into smaller disk drive units;

(b) by virtue of its pivotal movement, the effective mass of the actuator is smaller, thereby enabling faster access times and less power; and (c) by virtue of its pivotal movement, there is no need to move the head-connecting cables (which provide power and signaling) over the entire displacement range of the head; note, when such cables can enter housing 22 in close proximity to the pivot axis, they need only move a fraction of the distance traversed by the head.

The invention has been described in detail with particular reference to preferred embodiments thereof, but it will be understood that variations and modifications can be effected within the spirit and scope of the invention.

I claim:

1. Radial access apparatus for controlling the radial movement of a write/read head relative to a data storage disk, whereby such head is positioned to write or read information on any one of a plurality of concentric data tracks on such disk, said apparatus comprising:

(a) a frame;
   (b) a pair of flat flexure members of the type adapted to flex only in single plane which is perpendicular to the plane of said members, each of said members having first and second spaced edges;
   (c) support means mounted on said frame for supporting each flexure member along one of its edges so that the respective supported edges of said flexure members are fixed in space relative to each other, and so that the respective unsupported portions of said flexure members extend outwardly from said support means toward a line of convergence;
   (d) a radial access arm interconnecting the respective outwardly extending edges of such flexure members at a location short of said line of convergence, said arm having a portion extending between sid flexures and outwardly from a line drawn between the unsupported edges of said flexure members, said portion being adapted to support a write/read head; and
   (e) means for imparting motion to said arm to cause said portion to undergo a seemingly pivotal movement about a virtual pivot axis defined by said line of convergence, whereby a write/read head supported by said arm moves along an arcuate path, relative to the radius of a disk.

2. The apparatus as defined by claim 1 wherein said motion imparting means comprises electromagnetic means including a selectively energizable coil supported by said arm, and magnetic field-producing means supported by said frame for producing a magnetic field in the vicinity of said coil.

3. The apparatus as defined by claim 1 wherein said apparatus is positioned relative to the disk so that the angular displacement ($\Phi$) of said arm as it undergoes a seemingly pivotal movement is substantially equal to the angular displacement ($\alpha$) between a line connecting the center of the disk and the head position after movement of the arm, and a line connecting the center of the disk and the head prior to arm movement.

4. The apparatus as defined by claim 1 wherein each of said flexure members comprises a substantially rigid, rectangularly shaped central portion having a pair of spacedflexible tabs extending from opposite sides thereof.

5. The apparatus as defined by claim 4 wherein one pair of said tabs is rigidly connected to said support means, and wherein the other pair of said tabs is rigidly connected to said pivot arm.

* * * * *